United States Patent
Nezu et al.

(10) Patent No.: US 6,242,123 B1
(45) Date of Patent: Jun. 5, 2001

(54) SOLID POLYELECTROLYTE MEMBRANE FOR FUEL CELLS, AND METHOD FOR PRODUCING IT

(75) Inventors: Shinji Nezu, Obu; Naoki Ito, Chiryu; Chiaki Yamada, Hekinan; Michiaki Kato, Aichi-ken; Michio Asukabe, Chiryu, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/163,009

(22) Filed: Sep. 30, 1998

(30) Foreign Application Priority Data

Sep. 30, 1997 (JP) .................................................. 9-266688

(51) Int. Cl.$^7$ ...................................................... H01M 8/10
(52) U.S. Cl. .................................. 429/33; 429/41; 429/46
(58) Field of Search .................................... 429/33, 41, 46

(56) References Cited

U.S. PATENT DOCUMENTS

| 4,012,303 | 3/1977 | D'Agostino et al. | 521/27 |
| 4,605,685 | 8/1986 | Momose et al. | 522/124 |
| 5,817,718 | 10/1998 | Nezu et al. | 429/130 |

FOREIGN PATENT DOCUMENTS

| 0 222 926 | 5/1987 | (EP) . |
| 0 341 716 | 11/1989 | (EP) . |
| 0 456 939 | 11/1991 | (EP) . |
| 1 217 073 | 12/1970 | (GB) . |
| 1 302 619 | 1/1973 | (GB) . |
| 1 498 990 | 1/1978 | (GB) . |
| 9-102322 | 4/1997 | (JP) . |
| WO 98/20063 | * 5/1998 | (WO) . |

* cited by examiner

*Primary Examiner*—Laura Weiner
(74) *Attorney, Agent, or Firm*—Oblon, Spivak, McClelland, Maier & Neustadt, P.C.

(57) ABSTRACT

A solid polyelectrolyte membrane for a fuel cell, comprises a synthetic resin comprising main chains and side chains, the main chains having a copolymer structure of a first olefin hydrocarbon and an olefin perfluorocarbon, the side chains having a sulfonic acid group containing crosslinked copolymer structure of a second olefin hydrocarbon and a diolefin hydrocarbon. The solid polyelectrolyte membrane is an inexpensive, solid polyelectrolyte membrane for fuel cells, of which the water content is controlled so that it does not cause too much wetting of electrode catalysts.

31 Claims, 2 Drawing Sheets

SOLID POLYELECTROLYTE MEMBRANE FOR FUEL CELLS, AND METHOD FOR PRODUCING IT

BACKGROUND OF THE INVENTION

1. Field of the Invention

The present invention relates to a solid polyelectrolyte membrane for fuel cells, and to a method for producing it.

2. Discussion of the Background

A polyelectrolyte-type fuel cell comprises a gas-diffusing cathode electrode, a gas-diffusing anode electrode and a solid polyelectrolyte membrane. Oxygen gas and hydrogen gas are supplied to the cathode and the anode, respectively, to generate electricity between the electrodes. The function of the polyelectrolyte membrane is to transport hydrogen ions, formed around the gas-diffusing anode electrode, to the gas-diffusing cathode electrode. Around the gas-diffusing cathode electrode, the thus-transported hydrogen ions react with oxygen gas and electrons to produce water.

The performance of the cell depends on the catalytic activity of the catalyst used in each gas-diffusing electrode, the gas-diffusing ability of each electrode, the hydrogen ion conductivity of the solid polyelectrolyte membrane, etc. Therefore, the internal resistance of the cell could be smaller when the solid polyelectrolyte membrane in the cell has a higher hydrogen ion conductivity, resulting in superior performance of the cell.

The solid polyelectrolyte membrane is produced by forming a resin having an ion-exchanging function into films; a membrane having a higher degree of ion-exchanging capacity having a higher degree of ion conductivity. Compared with other cells, the solid polyelectrolyte-type fuel cell is more compact and produces more power. Therefore, in the future, this type of fuel cell will be widely used as the power source for electric cars.

In solid polyelectrolyte-type fuel cells produced in the early years, an ion-exchange membrane used was prepared by infiltrating monomers of styrene and divinylbenzene into a reinforcing cloth followed by copolymeriztion, as the electrolyte membrane. However, since its durability is extremely poor, this ion-exchange membrane is impractical. Since then, perfluorosulfonic acid membranes (trade name, NAFION) developed by DUPONT have been generally used.

The perfluorosulfonic acid membranes have good ion conductivity and durability. However, since they are formed from a fluorine resin, they are extremely expensive, which is a serious bar to the commercialization of solid polyelectrolyte-type fuel cells for electric cars. For these reasons, various studies have heretofore been made for developing inexpensive electrolyte membranes capable of being substituted for NAFION. However, it has been presumed that electrolyte membranes essentially comprising a hydrocarbon resin will decompose at the hydrocarbon polymer chains by the action of peroxides or active radicals formed as intermediates in the electrode reaction, and it has been reported that, when such electrolyte membranes are used in cells, the cell output is lowered immediately after the cells have started.

SUMMARY OF THE INVENTION

The present inventors have developed ion-exchange polymer membranes. The membranes are produced by introducing styrene, which is a hydrocarbon monomer, into an ethylene-tetrafluoroethylene copolymer resin film, which is a popular inexpensive film, through radiation grafting polymerization, followed by sulfonating the resulting film. The membranes function well as solid electrolyte membranes for polyelectrolyte-type fuel cells. In fact, it has been verified that the cells comprising the ion-exchange polymer membrane of the present invention have higher power-generating capabilities than those comprising NAFION, and in durability tests for continuous operation, the cells lasted for about 600 hours. Thus, the ion-exchange polymer membranes are inexpensive and have both high ion conductivity and high durability.

However, the polyelectrolyte membranes as produced by grafting such an ethylene-tetrafluoroethylene copolymer resin film with styrene through radiation grafting polymerization followed by introducing sulfonic acid groups thereinto have an extremely high water content. It has been found that, when the polyelectrolyte of that type is used in the polyelectrolyte membrane in a fuel cell and when the catalyst layers of the gas-diffusing electrodes in the cell do not have satisfactory water repellency, the electrodes in the cell, especially the cathode at which water is formed through fuel cell reaction, are much wetted, causing the problem of output depression. In order to avoid this problem, it will be effective to add a water-repellent resin, such as TEFLON or the like, to the electrode catalyst layers; however, this is unfavorable, because it sacrifices the cell performance. This is because the resin added interferes with the diffusibility of the gas supplied to the electrodes and therefore increases the resistance of the electrodes.

The present invention has been made in consideration of the matters noted above, and its object is to provide an inexpensive, solid polyelectrolyte membrane for fuel cells, of which the water content is controlled so as to fall within a range which does not cause too much wetting of electrode catalysts.

The solid polyelectrolyte membrane for fuel cells of the invention is filmy and is made of a synthetic resin which comprises main chains having a copolymer structure of a first olefin hydrocarbon and an olefin perfluorocarbon, and side chains of a sulfonic acid group-having crosslinked polymer of a second olefin hydrocarbon and a diolefin hydrocarbon.

The first olefin hydrocarbon and olefin perfluorocarbon may contain 2 to 10 carbon atoms. The second olefin hydrocarbon may contain 8 to 20 carbon atoms, and the diolefin may contain 10 to 22 carbon atoms.

Preferably, the main chains are of an ethylene-tetrafluoroethylene copolymer, and the side chains are of a sulfonic acid group containing copolymer of styrene and divinylbenzene or a sulfonic acid group containing copolymer of styrene, α-methylstyrene and divinylbenzene.

The solid polyelectrolyte membrane of the invention may also be described as a crosslinked polymer, comprising main chains and side chains extending from the main chains, where the main chains comprise alkylene and perfluoroalkylene units, and the side chains comprise hydrocarbon sulfonic acid units. The alkylene units may contain 2 to 10 carbon atoms, preferably 2 or 3 carbon atoms. The perfluoroalkylene units may contain 2 to 10 carbon atoms, preferably 2 carbon atoms. The hydrocarbon sulfonic acid units preferably are arylalkylene sulfonic acid units, with the sulfonic acid moiety attached to the aryl group. The hydrocarbon sulfonic acid units may contain 8 to 20 carbon atoms, preferably 8 or 9 carbon atoms.

Also preferably, in the synthetic resin, the moiety of the side chains is from 10 to 150 parts by weight relative to 100 parts by weight of the moiety of the main chains.

Still preferably, the solid polyelectrolyte membrane has an ion exchange capacity of from 1.0 to 3.5 milliequivalents/gram, and has a water content of from 30 to 200%.

The invention also provides a method for producing the solid polyelectrolyte membrane for fuel cells, which comprises a grafting step of exposing a filmy copolymer of an olefin hydrocarbon and an olefin perfluorocarbon to radiation, followed by contacting and reacting the thus-irradiated copolymer film with a polymerizing olefin hydrocarbon and a polymerizing diolefin hydrocarbon, thereby forming side chains of crosslinked grafted polymer chains of said olefin hydrocarbon and said diolefin hydrocarbon in the copolymer, and a sulfonic acid group-introducing step of introducing sulfonic acid groups into said side chains of the resulting crosslinked grafted polymer.

Preferably, in the method, the main chains of the copolymer are of an ethylene-tetrafluoroethylene copolymer or a propylene-tetrafluoroethylene copolymer, and the side olefins are of a copolymer of styrene and divinylbenzene or a copolymer of styrene, α-methylstyrene and divinylbenzene.

Also preferably, the dose of radiations is from 1 to 100 KGy.

Still preferably, the grafting step is effected at a temperature not higher than the boiling point of the polymerizing olefin aromatic hydrocarbon.

Further preferably, the sulfonic acid group-introducing step is to introduce sulfonic acid groups into the side chains by using fluorosulfonic acid or chlorosulfonic acid.

The invention provides another method for producing the solid polyelectrolyte membrane for fuel cells, which comprises exposing a filmy copolymer of an olefin hydrocarbon and an olefin perfluorocarbon to radiations, followed by contacting the thus-irradiated copolymer with a polymerizing, sulfonic acid group containing olefinic aromatic hydrocarbon and a polymerizing diolefin aromatic hydrocarbon, thereby forming side chains of crosslinked grafted polymer chains of said sulfonic acid group containing olefin aromatic hydrocarbon and said diolefin aromatic hydrocarbon in the copolymer.

Preferably, in the method, the main chains of the copolymer are of an ethylene-tetrafluoroethylene copolymer or a propylene-tetrafluoroethylene copolymer, and the side chains are of a sulfonic acid group containing copolymer of styrene and divinylbenzene or a sulfonic acid group containing copolymer of styrene, α-methylstyrene and divinylbenzene.

Also preferably, the dose of radiations is from 1 to 100 KGy.

Still preferably, the grafting step is effected at a temperature not higher than the boiling point of the polymerizing olefin aromatic hydrocarbon.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
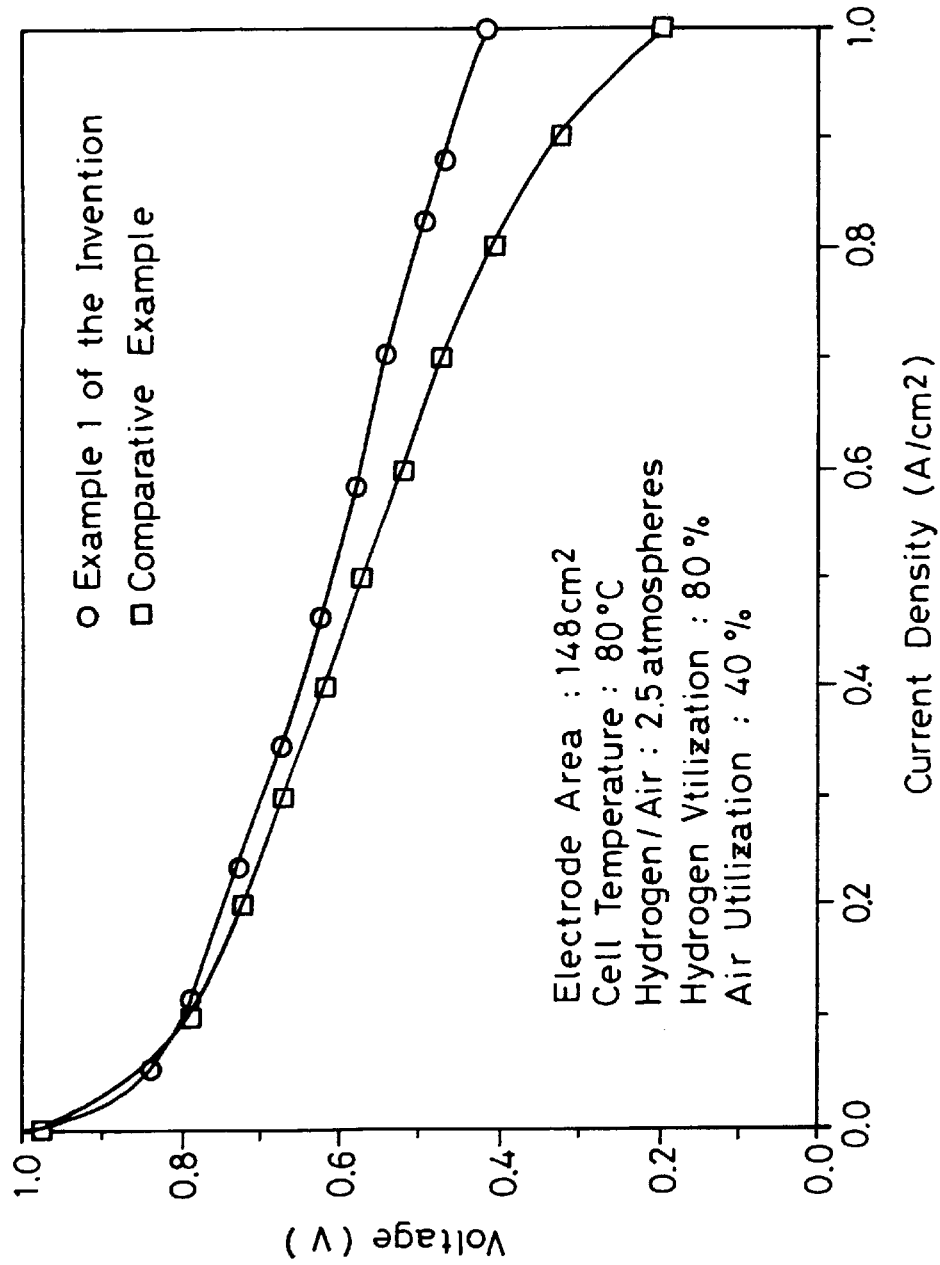
FIG. 1. is a graph showing the relationship between the voltage and the current density of the cells produced in Example 1 and Comparative Example.

The solid polyelectrolyte membrane for fuel cells of the invention is composed of main chains of a copolymer of an olefin hydrocarbon and an olefin perfluorocarbon, and side chains of a sulfonic acid group-having, crosslinked olefin hydrocarbon.

The main chains constituting the solid polyelectrolyte membrane are the base of the membrane, and are of a copolymer of an olefin hydrocarbon and an olefin perfluorocarbon.

As opposed to those, polymers of which the main chain is composed only of fluorocarbon polymer not having any olefin hydrocarbon moiety, are unfavorable. For example, polytetrafluoroethylene (PTFE), tetrafluoroethylene-hexafluoropropylene copolymers (FEP), tetrafluoroethylene-perfluoroalkyl vinyl ether copolymers (PFA) and the like are, when exposed to radiation, seriously cleaved at their polymer main chains, causing the irradiated films to greatly lose their mechanical strength even before they are grafted. In addition, after grafted, the films lose much more of their mechanical strength. As a result, electrolyte membranes of the grafted copolymer films are extremely brittle and weak, and are unsuitable for polyelectrolyte-type fuel cells. Even though used in polyelectrolyte-type fuel cells, the grafted copolymer films are problematic in that the ion-exchange group containing side chain moieties as introduced thereinto through the grafting reaction are dissolved and lost in water that is supplied into the cells from an external source, while the cells are driven, or in water that is formed in the cells through the fuel cell reaction.

After having been exposed to radiation, the copolymer film having the specific main chains of the invention shall have active points for grafting polymerization, and the copolymer film is, in that condition, grafted with an olefin hydrocarbon to form side chains and with a diolefin hydrocarbon to constitute crosslinking bonds between the side chains. In the thus-grafted copolymer film, the crosslinked side chains are bonded to the main chains. Specifically, in the crosslinking grafting polymerization of the copolymer to be effected in the presence of the diolefin hydrocarbon, the molecules of the side chains are surely crosslinked with each other to ensure the bonding between the main chain and the side chains of the graft-polymers, into which sulfonic acid groups are introduced in a later step. As a result, the copolymer film forms ion-exchange membranes having good mechanical strength and hydrophilicity. In addition, in the ion-exchange membrane of the copolymer film, the water-solubility of the ion-exchange group containing hydrophilic side chains is retarded, while the membrane is used in fuel cells, and the membrane is prevented from deteriorating.

The olefin hydrocarbon used to form the side chains is preferably an aromatic one into which the introduction of sulfonic acid groups is easy. Examples include styrene, α-methylstyrene, etc. Also preferably, the diolefin hydrocarbon is an aromatic one, such as divinylbenzene, etc.

In the polyelectrolyte membrane of the invention, it is desirable that the amount of side chains ranges between 10 and 150 parts by weight relative to 100 parts by weight of the amount of main chains. If the proportion of the side chains is smaller than 10 parts by weight, the amount of sulfonic acid groups capable of being introduced into the membrane is small, thereby resulting in a membrane that cannot function as an electrolyte. On the contrary, if the proportion of the side chains is larger than 150 parts by weight, the finction of the main chains is lowered, thereby unfavorably resulting in the strength of the membrane being lowered.

Sulfonic acid groups are introduced into the side chains. In general, they are introduced into the aromatic rings of the side chains as substituents, making the polymer membrane function as a polyelectrolyte. Preferably, the polymer membrane thus having the sulfonic acid groups introduced thereinto has an ion-exchange capacity of from 1.0 to 3.5 milli-equivalents/gram, when used as the electrolyte membrane in fuel cells.

Also preferably, the polymer membrane has a water content of from 30 to 200 wt. %, as it exhibits good capabilities when used as the electrolyte membrane in fuel cells.

The method for producing the solid electrolyte membrane of the invention comprises a grafting step and a sulfonic acid group-introducing step. In the grafting step, a filmy copolymer of an olefin hydrocarbon and an olefin perfluorocarbon is exposed to radiation so as to have active points for grafting polymerization, and thereafter it is contacted and reacted with a mixture of a polymerizing olefin hydrocarbon and a polymerizing diolefin hydrocarbon, thereby forming side chains of crosslinked grafted polymer chains of the olefin hydrocarbon and the diolefin hydrocarbon in the copolymer. The side chains of grafted polymers are crosslinked by the diolefin.

The dose of radiation is preferably from 1 to 100 KGy, so as not to decompose the main chains of the filmy copolymer, but to favorably form the active points for grafting polymerization. Also preferably, the grafting polymerization is effected at a temperature not higher than the boiling point of the monomers used.

In the sulfonic acid group-introducing step, the resulting copolymer film that has the side chains of crosslinked grafted polymers is contacted with fluorosulfonic acid or chlorosulfonic acid to introduce sulfonic acid groups into the film.

Sulfonic acid groups may be previously introduced into the olefin hydrocarbon and the diolefin hydrocarbon which are to form the crosslinked side chains, and the sulfonic acid group containing hydrocarbons may be used for the grafting polymerization. In this case, sulfonic acid groups may be introduced into the filmy copolymer in one step of grafting polymerization.

In the step of grafting polymerization, the sulfonic acid group containing hydrocarbons may be combined with olefin hydrocarbons not having a sulfonic acid group so as to control the ion-exchange capacity of the copolymer film.

The solid polyelectrolyte film thus produced has crosslinked side chains, in which the conformation of the ion-exchange groups is restrained by the crosslinking structure of the side chains, thereby preventing too much water from entering the electrolyte film. In addition, since the ion-exchange group containing side chains are crosslinked, their movement is controlled. Therefore, it is believed that the surface of the membrane could still have the properties of the hydrophobic main chain moiety, or that is, the surface of the membrane is kept hydrophobic to have a lowered electric resistance.

As opposed to the polyelectrolyte membrane of the invention, conventional polyelectrolyte membranes having non-crosslinked side chains will have a large water content falling between 100 and 200 wt. %, if their composition is so controlled as to have a hydrogen ion conductivity equivalent to that of NAFION. In this condition, the surfaces of the membranes are completely wetted with water. In the conventional polyelectrolyte membranes, the ion-exchange group containing side chain moiety is not restrained. Therefore, it is believed that, when water penetrates into the membranes, the side chains are deformed and bent to have a more stable conformation, resulting in the membranes absorbing and keeping a large amount of water. For these reasons, a large amount of water repellent must be added to the gas-diffusing electrode in the cell having the conventional electrolyte membrane. As opposed to this, the solid polyelectrolyte membrane of the invention does not require any water repellent for lowering its electric resistance. The membrane has suitable water repellency, while having a controlled water content.

EXAMPLES

Having generally described this invention, a further understanding can be obtained by reference to certain specific examples which are provided herein for purposes of illustration only and are not intended to be limiting unless otherwise specified.

Example 1

An ethylene-tetrafluoroethylene copolymer resin film (thickness: 50 $\mu$m) was exposed to gamma rays at a dose of 5 KGy, in air at room temperature, and then contacted with a mixture of 95 parts by weight of styrene and 5 parts by weight of divinylbenzene, from which oxygen had been completely removed through nitrogen bubbling, at 60° C. for 2 hours, whereby the copolymer film was grafted with the monomers. The resulting film was, after having been washed and dried, then contacted with a mixture of 5 parts by weight of chlorosulfonic acid and 60 parts by weight of dichloroethane at room temperature in a nitrogen atmosphere for 1 hour, whereby the film was sulfonated. Next, this was washed with water at 90° C. for 1 hour. The thus-processed film had an ion-exchange capacity of 1.75 milli-equivalents/g, and a water content of 66 wt. % at room temperature.

In a Comparative Example, a comparative sample was prepared in the same manner as above except that the resin film was grafted with styrene only, not with the mixture of 95 parts of styrene and 5 parts of divinylbenzene. The comparative sample had an ion-exchange capacity of 1.80 milli-equivalents/g, and a water content of 120 wt. % at room temperature.

Sheets of commercially-available carbon paper were coated with a TEFLON dispersion, baked, and processed to have water-repellency. One surface of each sheet was coated with a mixture of a commercially-available, platinum-carrying carbon (platinum weight: 40 wt. %), commercially-available NAFION solution and isopropanol, in an amount of 0.35 mg platinum/cm$^2$, to prepare gas-diffusing electrodes.

The gas-diffusing electrodes were used as the cathode and the anode, and combined with the electrolyte membrane prepared herein by hot pressing to construct a fuel cell. To compare the fuel cell having the electrolyte membrane of Example 1 of the invention with that having the comparative electrolyte membrane of the Comparative Example, the V-I characteristics of those cells were measured at a hydrogen pressure of 2.5 atmospheres (utilization: 80%), an air pressure of 2.5 atmospheres (utilization: 40%) and a cell temperature of 80° C.

As shown in FIG. 1, the cell having the electrolyte membrane of Example 1, of which the water content was lower, could be operated well even in the high current density region, but the cell having the electrolyte membrane of the Comparative Example, of which the water content was higher, could not, as its voltage depression was great in the high current density region. The water content of the electrolyte membrane of the Comparative Example was too high, and the water repellency of the membrane at its surface was poor. It is believed that, in the cell having the comparative electrolyte membrane, too much water formed in the cell or supplied from the external source would exist around the platinum catalyst, interfering with the gas diffusion in the cell, reducing the capabilities of the cell.

Example 2

Figure 2:
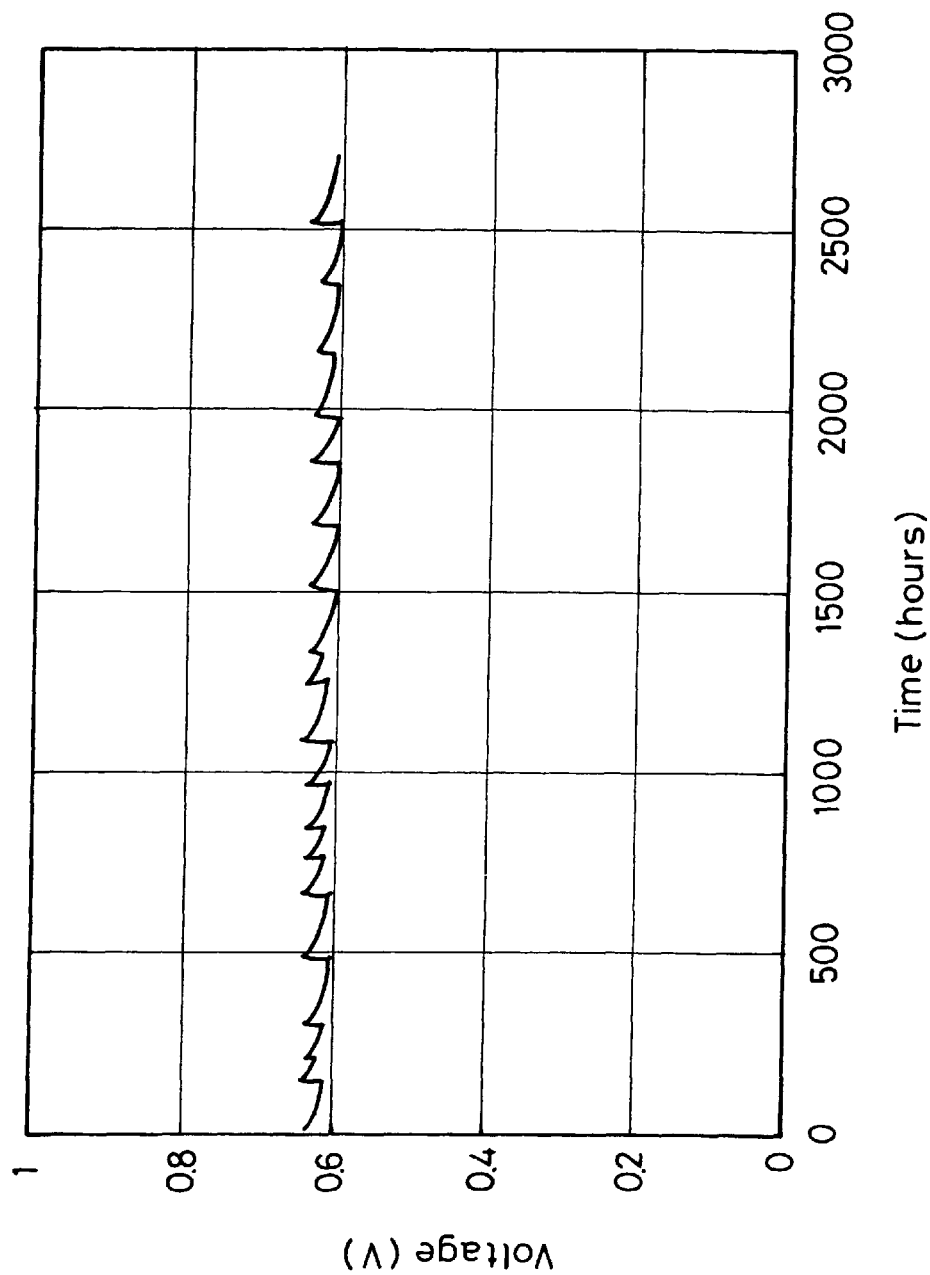
FIG. 2. is a graph showing the time-dependent variation in the voltage of the cell of Example 1 having been tested in a durability test.

The cell of Example 1 was tested in a continuous running test at a hydrogen pressure of 1 atmosphere (utilization: 80%), an oxygen pressure of 1 atmosphere (utilization: 80%), a current density of 0.6 A/cm$^2$ and a cell temperature of 70° C. As shown in FIG. 2, the membrane in the cell was not broken during continuous running for up to 2650 hours, and no output depression caused an increase in the resistance. In FIG. 2, discontinuous points in a cycle of from tens hours to hundreds hours are shown. Regarding these, the gas flow line was clogged with water during the continuous running test, lowering the voltage of the cell being tested, and the circuit was instantaneously opened in that cycle to cut the current flow passing through the cell, thereby discharging water to restore the voltage of the cell. Therefore, the discontinuous points seen in FIG. 2 do not indicate the deterioration of the electrolyte membrane in the cell tested.

As has been described in detail herein above, the solid polyelectrolyte membrane of the invention has a controlled water content and a suitable degree of water repellency, while having good durability and good properties, and is favorably used in fuel cells.

Having now fully described the invention, it will be apparent to one of ordinary skill in the art that many changes and modifications can be made thereto without departing from the spirit or scope of the invention as set forth herein.

The priority document of the present application, Japanese Patent Application No: 09-266688 filed Sep. 30, 1997, is hereby incorporated by reference.

What is claimed is:

1. A solid polyelectrolyte membrane for a fuel cell, comprising a synthetic resin comprising main chains and side chains, said main chains having a copolymer structure of a first olefin hydrocarbon and an olefin perfluorocarbon, and said side chains having a sulfonic acid group containing crosslinked grafted copolymer structure of a second olefin hydrocarbon and a diolefin hydrocarbon.

2. The solid polyelectrolyte membrane of claim 1, wherein said main chains are an ethylene-tetrafluoroethylene copolymer or a propylene-tetrafluoroethylene copolymer, and said side chains are a sulfonic acid group containing copolymer of styrene and divinylbenzene, or a sulfonic acid group containing copolymer of styrene, α-methylstyrene and divinylbenzene.

3. The solid polyelectrolyte membrane of claim 1, wherein an amount of said side chains is from 10 to 150 parts by weight relative to 100 parts by weight of said main chains.

4. The solid polyelectrolyte membrane of claim 1, wherein said solid polyelectrolyte membrane has an ion exchange capacity of 1.0 to 3.5 milli-equivalents/gram.

5. The solid polyelectrolyte membrane of claim 1, wherein said solid polyelectrolyte membrane has a water content of from 30 to 200 wt. %.

6. A method for producing a solid polyelectrolyte membrane for a fuel cell, comprising:

forming side chains of crosslinked grafted polymer chains of a second olefin hydrocarbon and a diolefin hydrocarbon in a polymer of a first olefin hydrocarbon and an olefin perfluorocarbon to form a crosslinked grafted polymer, and introducing sulfonic acid groups into said side chains of said crosslinked grafted polymer.

7. The method of claim 6, wherein said copolymer is an ethylene-tetrafluoroethylene copolymer or a propylene-tetrafluoroethylene copolymer, and said side chains are a copolymer of styrene and divinylbenzene or a copolymer of styrene, α-methylstyrene and divinyl benzene.

8. The product produced by the process of claim 7.

9. The method of claim 6, wherein said introducing comprises reacting said side chains with fluorosulfonic acid or chlorosulfonic acid.

10. The product produced by the process of claim 6.

11. A method for producing a solid polyelectrolyte membrane for a fuel cell, comprising:

forming side chains of crosslinked grafted polymer chains of a second olefin hydrocarbon and a diolefin hydrocarbon in a polymer of a first olefin hydrocarbon and an olefin perfluorocarbon to form a crosslinked grafted polymer, and introducing sulfonic acid groups into said side chains of said crosslinked grafted polymer, wherein said forming comprises exposing said copolymer of said first olefin hydrocarbon and said olefin perfluorocarbon to radiation, followed by contacting the polymer with said second olefin hydrocarbon and said diolefin hydrocarbon, to form said side chains.

12. The method of claim 11, wherein the amount of radiation is from 1 to 100 KGy.

13. The method of claim 11, wherein said contacting is effected at a temperature not higher than the boiling point of said second olefin hydrocarbon.

14. The product produced by the process of claim 11.

15. A method for producing a solid polyelectrolyte membrane for a fuel cell, comprising:

forming side chains of crosslinked grafted polymer chains of a sulfonic acid group containing a second olefin hydrocarbon and a diolefin hydrocarbon in a copolymer of a first olefin hydrocarbon and an olefin perfluorocarbon to form a crosslinked grafted polymer.

16. The method of claim 15, wherein said copolymer is an ethylene-tetrafluoroethylene copolymer or a propylene-tetrafluoroethylene copolymer, and said side chains are a sulfonic acid group containing copolymer of styrene and divinylbenzene or a sulfonic acid group containing copolymer of styrene, α-methylstyrene and divinyl benzene.

17. The product produced by the process of claim 16.

18. The product produced by the process of claim 15.

19. A method for producing a solid polyelectrolyte membrane for a fuel cell, comprising:

forming side chains of crosslinked grafted polymer chains of a sulfonic acid group containing a second olefin hydrocarbon and a diolefin hydrocarbon in a copolymer of a first olefin hydrocarbon and an olefin perfluorocarbon, wherein said forming comprises exposing said copolymer of said first olefin hydrocarbon and said olefin perfluorocarbon to radiation, followed by contacting the copolymer with said sulfonic acid group containing second olefin hydrocarbon and said diolefin hydrocarbon, to form said side chains.

20. The method of claim 19, wherein the amount of radiation is from 1 to 100 KGy.

21. The method of claim 19, wherein said contacting is effected at a temperature not higher than the boiling point of said olefin hydrocarbon.

22. The product produced by the process of claim 19.

23. A solid polyelectrolyte membrane for a fuel cell, comprising a crosslinked grafted polymer comprising (i) main chains and (ii) side chains extending from said main chains, wherein said main chains comprise alkylene and perfluoroalkylene units, and said side chains comprise hydrocarbon sulfonic acid units.

24. The solid polyelectrolyte membrane of claim 23, wherein said alkylene units are ethylene or propylene, said perfluoroalkylene units are tetrafluoroethylene, said side hydrocarbon sulfonic acid units are sulfonic acid containing styrene.

25. The solid polyelectrolyte membrane of claim 23, wherein an amount of said side chains is from 10 to 150 parts by weight relative to 100 parts by weight of said main chains.

26. A fuel cell, comprising:
(i) a gas-diffusing cathode,
(ii) a gas-diffusing anode, and
(iii) the solid polyelectrolyte membrane of claim 1, between said gas-diffusing cathode and said gas-diffusing anode.

27. A fuel cell, comprising:
(i) a gas-diffusing cathode,
(ii) a gas-diffusing anode, and
(iii) the solid polyelectrolyte membrane of claim 2, between said gas-diffusing cathode and said gas-diffusing anode.

28. A fuel cell, comprising:
(i) a gas-diffusing cathode,
(ii) a gas-diffusing anode, and
(iii) the solid polyelectrolyte membrane of claim 3, between said gas-diffusing cathode and said gas-diffusing anode.

29. A fuel cell, comprising:
(i) a gas-diffusing cathode,
(ii) a gas-diffusing anode, and
(iii) the solid polyelectrolyte membrane of claim 26, between said gas-diffusing cathode and said gas-diffusing anode.

30. A fuel cell, comprising:
(i) a gas-diffusing cathode,
(ii) a gas-diffusing anode, and
(iii) the solid polyelectrolyte membrane of claim 27, between said gas-diffusing cathode and said gas-diffusing anode.

31. A fuel cell, comprising:
(i) a gas-diffusing cathode,
(ii) a gas-diffusing anode, and
(iii) the solid polyelectrolyte membrane of claim 28, between said gas-diffusing cathode and said gas-diffusing anode.

* * * * *